United States Patent
Dwersteg (10) Patent No.: US 12,068,714 B2
(45) Date of Patent: Aug. 20, 2024

(54) METHOD AND CIRCUIT ASSEMBLY FOR SENSORLESS LOAD DETECTION IN STEPPER MOTORS

(71) Applicant: Maxim Integrated Products, Inc., San Jose, CA (US)

(72) Inventor: Bernhard Dwersteg, Rellingen (DE)

(73) Assignee: Maxim Integrated Products, Inc., Wilmington, MA (US)

( * ) Notice: Subject to any disclaimer, the term of this patent is extended or adjusted under 35 U.S.C. 154(b) by 0 days.

(21) Appl. No.: 17/289,196

(22) PCT Filed: Oct. 29, 2019

(86) PCT No.: PCT/DE2019/100933
§ 371 (c)(1),
(2) Date: Apr. 27, 2021

(87) PCT Pub. No.: WO2020/088715
PCT Pub. Date: May 7, 2020

(65) Prior Publication Data
US 2022/0123673 A1    Apr. 21, 2022

(30) Foreign Application Priority Data
Oct. 29, 2018    (DE) ..................... 10 2018 126 954.4

(51) Int. Cl.
*H02P 8/34*    (2006.01)
(52) U.S. Cl.
CPC ..................... *H02P 8/34* (2013.01)
(58) Field of Classification Search
CPC .... H02P 1/426; H02P 6/18; H02P 8/34; H02P 25/04; H02P 23/10; H02H 7/09; G05B 19/042
See application file for complete search history.

(56) References Cited

U.S. PATENT DOCUMENTS

| | | |
|---|---|---|
| 4,806,838 A | 2/1989 | Weber |
| 10,075,113 B2 | 9/2018 | Dwersteg |
| (Continued) | | |

FOREIGN PATENT DOCUMENTS

| | | |
|---|---|---|
| CH | 698458 B1 | 8/2009 |
| CN | 103532183 A | 1/2014 |
| (Continued) | | |

OTHER PUBLICATIONS

German Search Report mailed Sep. 4, 2019, in the related international application No. PCT/DE2019/100933 filed Oct. 29, 2019, (9 pgs).

(Continued)

*Primary Examiner* — Said Bouziane
(74) *Attorney, Agent, or Firm* — Michael North; North Weber & Baugh (57) ABSTRACT

A method and a circuit assembly are described with which, in a stepper motor, a mechanical load applied to the motor shaft of which can be detected without a sensor in a voltage-based operating mode in which a nominal coil current is generated by applying a predetermined coil voltage (Us) to the coil. The coil is connected in a bridge branch of a bridge circuit formed from a first to fourth semiconductor switch (S1, . . . S4), wherein the predetermined coil voltage (Us) is applied to the coil with a variable duty cycle (T) by switching the semiconductor switch in the form of at least one PWM voltage (U(A1), U(A2)). The motor load is detected in the form of a load indicator signal (L) which represents a phase shift between a zero crossing of the predefined coil voltage (Us) and the next zero crossing of the coil current (Icoil) generated thereby, wherein a zero crossing of the coil current (Icoil) is defined when, in those time intervals (tm) in which the PWM voltage (U(A1), U(A2)) applied to the coil is zero, a polarity change occurs in a (Continued)

voltage dropping across the internal resistances of the semiconductor switches due to the coil current.

17 Claims, 3 Drawing Sheets

(56) References Cited

U.S. PATENT DOCUMENTS

| | | |
|---|---|---|
| 2005/0276084 A1 | 12/2005 | Wai et al. |
| 2006/0175999 A1 | 8/2006 | Min |
| 2006/0285366 A1 | 12/2006 | Radecker et al. |
| 2009/0027925 A1 | 1/2009 | Kanouda et al. |
| 2009/0066278 A1 | 3/2009 | Arisawa |
| 2009/0206818 A1 | 8/2009 | Horan |
| 2011/0169442 A1 | 7/2011 | Birumachi |
| 2013/0088183 A1 | 4/2013 | Marcoccia |
| 2014/0292252 A1 | 10/2014 | Lopez-Diaz et al. |
| 2017/0194886 A1* | 7/2017 | Dwersteg ............ H02P 8/18 |

FOREIGN PATENT DOCUMENTS

| | | | |
|---|---|---|---|
| DE | 102014212612 A1 * | 12/2015 | ............ H02P 8/38 |
| DE | 102014212612 A1 | 12/2015 | |
| DE | 112017004395 T5 | 5/2019 | |
| EP | 1514342 | 12/2003 | |
| JP | H0947029 A | 2/1997 | |
| JP | 4653857 B1 | 10/2009 | |
| KR | 20090058590 A | 6/2009 | |
| WO | 2018072791 A1 | 4/2018 | |

OTHER PUBLICATIONS

International Search Report mailed Jan. 21, 2020, in the related international application No. PCT/DE2019/100933 filed Oct. 29, 2019, (14 pgs).

Chinese office action mailed Dec. 30, 2023, in the related Chinese application No. 201980072063.9. (11 pgs).

* cited by examiner

METHOD AND CIRCUIT ASSEMBLY FOR SENSORLESS LOAD DETECTION IN STEPPER MOTORS

CROSS REFERENCE TO RELATED PATENT APPLICATIONS

The present application claims priority benefit to the PCT Application No. PCT/DE2019/100933, filed on Oct. 29, 2019, entitled " METHOD AND CIRCUIT ASSEMBLY FOR SENSORLESS LOAD DETECTION IN STEPPER MOTORS," listing as inventor Bernhard Dwersteg, which claims priority benefit to German Patent Application, Serial Number 102018126954.4 entitled "METHOD AND CIRCUIT ASSEMBLY FOR SENSORLESS LOAD DETECTION IN STEPPER MOTORS", filed on Oct. 29, 2018 and listing as inventor Bernhard Dwersteg. Each reference mentioned in this patent document is incorporated by reference herein in its entirety and for all purposes.

TECHNICAL FIELD

The invention relates to a method and a circuit assembly with which, in a stepper motor, a mechanical load applied to the motor shaft thereof can be detected without sensors in a voltage-based (that is, voltage-controlled for voltage-regulated) operating mode. The invention can be used for 2-phase and for 3- or multi-phase stepper motors.

BACKGROUND

WO 2011/026489 describes a method and a circuit assembly for sensorless motor load or load angle detection in a stepper motor, in which coil currents are impressed in the motor coils in chopper operation by activating ON and FD (fast decay) phases, and in which, during a falling amount of a current flowing through at least one of the coils, a difference is determined between a period of time of the ON phases and a period of time of the FD phases, the load angle being approximately 90° or the motor load being assumed as maximum when this difference is at least substantially zero.

Furthermore, WO 2012/062310 describes a method and a circuit assembly for sensorless motor load angle or load value detection in a stepper motor, in which nominal coil currents supplied by means of a chopper method are also generated chopper switching signals with which the nominal coil currents in the motor coil terminals are impressed by means of a motor supply voltage, wherein the load angle or the load value generate a counter-induced voltage (counter-EMF) in the motor coils, and wherein a phase shift of the motor voltage caused by the counter-induced voltage at at least one of the motor coil terminals relative to the coil current at said motor coil terminal is detected and the load angle or the load value is determined on the basis of this phase shift.

A common feature of these two known methods and circuit assemblies is that they relate to the current-controlled operation of the motor, in which the actual coil currents are measured and, as a function of the deviation thereof from the instantaneous nominal coil current values, timed correspondingly measured current pulses are impressed into the motor coils by means of the chopper method. However, said current-controlled operating mode can have disadvantages, particularly at low motor speeds and when the motor is at a standstill in an electrically defined position (that is, in a certain rotational position), which consist, for example, in the fact that brief current changes can occur due to control fluctuations that lie in the audible frequency range and are perceived as annoying. In addition, with low motor currents in connection with the only very short duration of the impressed current pulses resulting therefrom, due to transient processes and blank times, it can be difficult to reliably measure the coil current actually flowing during said short phases and to compare said coil current with the respective instantaneous nominal coil current value.

It is therefore preferred to operate the motor below a predetermined speed in the voltage-based (that is, voltage-controlled or voltage-regulated) operating mode mentioned at the beginning, in which the required coil current is not impressed via the activation and duration of current flow phases (that is, chopper phases), but is generated by means of a voltage applied to the motor coils (particularly a PWM voltage) and is set by changing the amount (amplitude) and the direction (polarity) of said voltage (or of the duty cycle of the PWM voltage). Methods and circuit assemblies of this type are known from WO 2015/192831 and WO 2018/072791. However, the above-mentioned types of load angle measurement cannot be sensibly achieved in this operating mode.

SUMMARY OF THE INVENTION

The invention is therefore based on the object of creating a method and a circuit assembly with which, in said voltage-based (that is, voltage-controlled or voltage-regulated) operating mode of the stepper motor, a mechanical load of the motor applied to the motor shaft thereof can be detected without a sensor. This object is achieved using a method according to claim 1 and a circuit assembly according to claim 4.

Using these solutions, sensorless load measurement and, after appropriate conversion, a load angle determination of the stepper motor, if necessary, is thus made possible at low motor speeds, at which the voltage-based (that is, voltage-controlled or voltage-regulated) operating mode is preferred. This is of particular importance for stop detection, the determination of load profiles and energy-efficient control of the motor over the entire speed range, that is, particularly in combination with said load angle detection in the current-controlled operating mode at higher motor speeds.

A particular advantage of the solutions according to the invention is that they can be achieved with only a small expenditure of chip surface. Particularly, no analogue-digital converter having corresponding digital signal processing and complex vector operations is required to determine the current profile. No additional current measuring resistors are required, which would not only cause higher costs but also an increase in power loss.

In principle, according to the invention, the phase shift between the actual coil current and the (known) voltage (voltage specification) applied to the coil is determined in said voltage-based operating mode in order to determine therefrom either a mechanical load applied to the motor shaft or also generator operation of the motor without a sensor. When no load is applied to the motor, the load angle (that is, the angle between the rotor field and the stator field of the motor) is 0° and the coil current lags behind the applied coil voltage with a phase shift of up to 90°. With increasing load, the load angle increases from 0° to up to 90°, while the phase shift between applied coil voltage and coil current decreases from 90° down to 0°. In generator operation, the phase shift between the coil current and the applied coil voltage increases from 90° to up to 180°.

The determination of said phase shift requires a precise determination of at least one specific point in the current profile of the actual coil current, for example, the peak value or zero crossing thereof, at which the phase shift relative to the coil voltage is then measured.

According to the invention, the point in time at which this phase shift is determined is preferably the zero crossing of the actual coil current, because this can be determined in a stable and clear manner independently of the actual maximum of the coil current. In addition, the gradient of the generally sinusoidal coil current is highest at the zero crossing, so that this point in time and thus the phase shift can be determined most precisely here.

In connection with the current-regulated operating mode, it is known to determine the actual coil current profile and thus also the zero crossing thereof on the basis of the voltage drop caused by the coil current at a current measuring resistor which is disposed at the base point of a bridge circuit formed from a first to fourth semiconductor switch, wherein the coil is connected in a branch of the bridge circuit and the semiconductor switches are used to switch the currents flowing through the relevant motor coil.

However, particularly with a high motor load and the thus associated small shift between the coil voltage and the coil current, the duty cycle of the (PWM) voltage applied to the relevant coil is substantially zero in the vicinity of the zero crossing of the coil current. In said current zero crossing, the coil is therefore almost exclusively present in the region of the recirculation, and substantially no coil current flows through said current measuring resistor. Thus, when the voltage crosses zero, the voltage drop across this current measuring resistor only occurs with a low duty cycle close to or at zero, so that a meaningful evaluation is only possible to a limited extent.

According to the invention, therefore, in the voltage-based operating mode for detecting the zero crossing of the actual coil current, it is not the voltage drop across said current measuring resistor, but the voltage drop across the internal resistances of the semiconductor switches caused by the coil current that is detected at those points in time or in those time intervals in which the (PWM) voltage applied to the coil is zero.

The voltage drop is preferably determined in the form of the difference between the voltages at the two low-side or high-side semiconductor switches of the bridge circuit. A zero crossing of the actual coil current is defined in each case at the points in time at which this difference is zero.

The phase shift between the zero crossing of the coil current determined particularly in this way and the (known) zero crossing of the applied coil voltage can then be quantified, for example, in the form of the current state of a microstep counter at the point in time of the zero crossing of the coil current, which thus represents an indicator of the applied motor load and represents the load angle of the motor after corresponding conversion or normalisation. The microstep counter is started at the point in time of the zero crossing of the usually sinusoidal (predetermined) coil voltage (particularly in the first quadrant of this voltage), wherein the coil voltage is composed of a plurality of sine values stored in a sine table and read out sequentially in time, with each of which a microstep is produced.

The individual sine values can preferably be read from the sine table for a first direction of rotation of the motor in a first direction from 0° to 90° (or 360°) and for the opposite second direction of rotation of the motor in the opposite second direction, that is, from 90° (or 360°) up to 0°.

Since two zero crossings occur in each (sinusoidal) complete coil current wave, the phase shift (load indicator) can be determined a total of four times in each full wave, that is, once in each full step of the motor, with two motor coils.

The semiconductor switches are preferably implemented as MOSFET switches. The absolute value of the internal resistance, even when subject to said sample variations and a thermal dependency, has no relevant meaning due to said formation of the difference or the query for the zero crossing. By subtracting the voltages at two respective MOSFET switches (which are selected with as low resistance as possible for reasons of efficiency), the amount of the relatively low voltage drop across a MOSFET switch is doubled, so that a particularly robust detection of the zero crossing of the coil current is ensured.

BRIEF DESCRIPTION OF THE DRAWINGS

Further details, features and advantages of the invention emerge from the following description of preferred embodiments with reference to the drawing. They show.

DETAILED DESCRIPTION

The invention is based on a method and a circuit assembly for controlling a stepper motor in a voltage-based (that is, voltage-controlled or voltage-regulated) operating mode according to the disclosure in WO 2015/192831. In the following description, therefore, substantially only the developments according to the invention of said known method or said known circuit assembly are explained, while reference is made to said document with regard to the method steps and circuit components that have been adopted unchanged.

Figure 1:
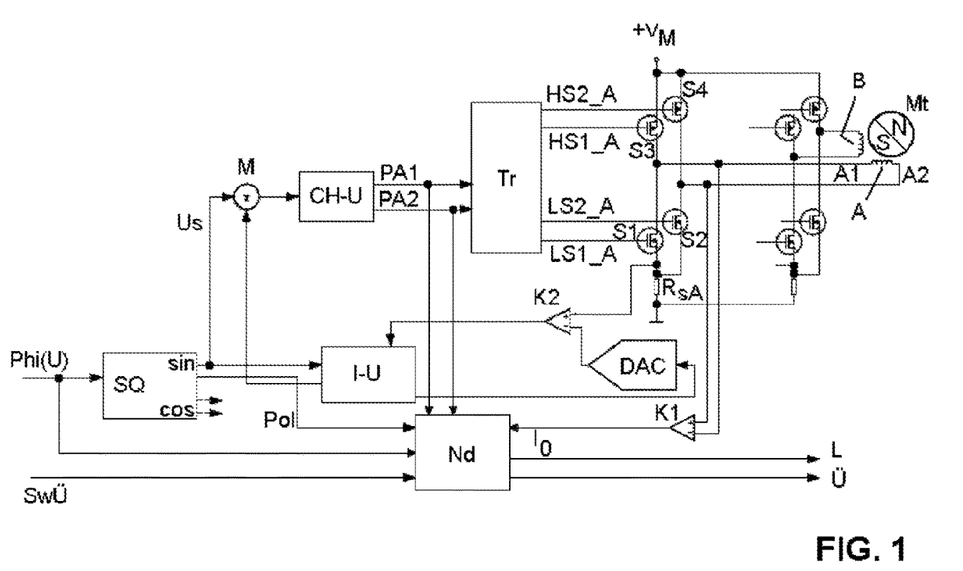
FIG. 1 a block diagram of an embodiment of a circuit assembly for carrying out the method according to the invention.

FIG. 1 shows a block diagram of an embodiment of a circuit assembly for carrying out the method according to the invention for a first coil A of a stepper motor Mt. The components shown are also to be provided in the same way for the second coil B (and, if applicable, each additional coil) of the stepper motor Mt to be controlled.

The circuit assembly comprises a bridge circuit formed from a first to fourth semiconductor switch S1, S2, S3, S4, the bridge circuit lying between a supply voltage VM and earth and in the bridge branch of which the first coil A of the stepper motor Mt is connected.

Figure 3:
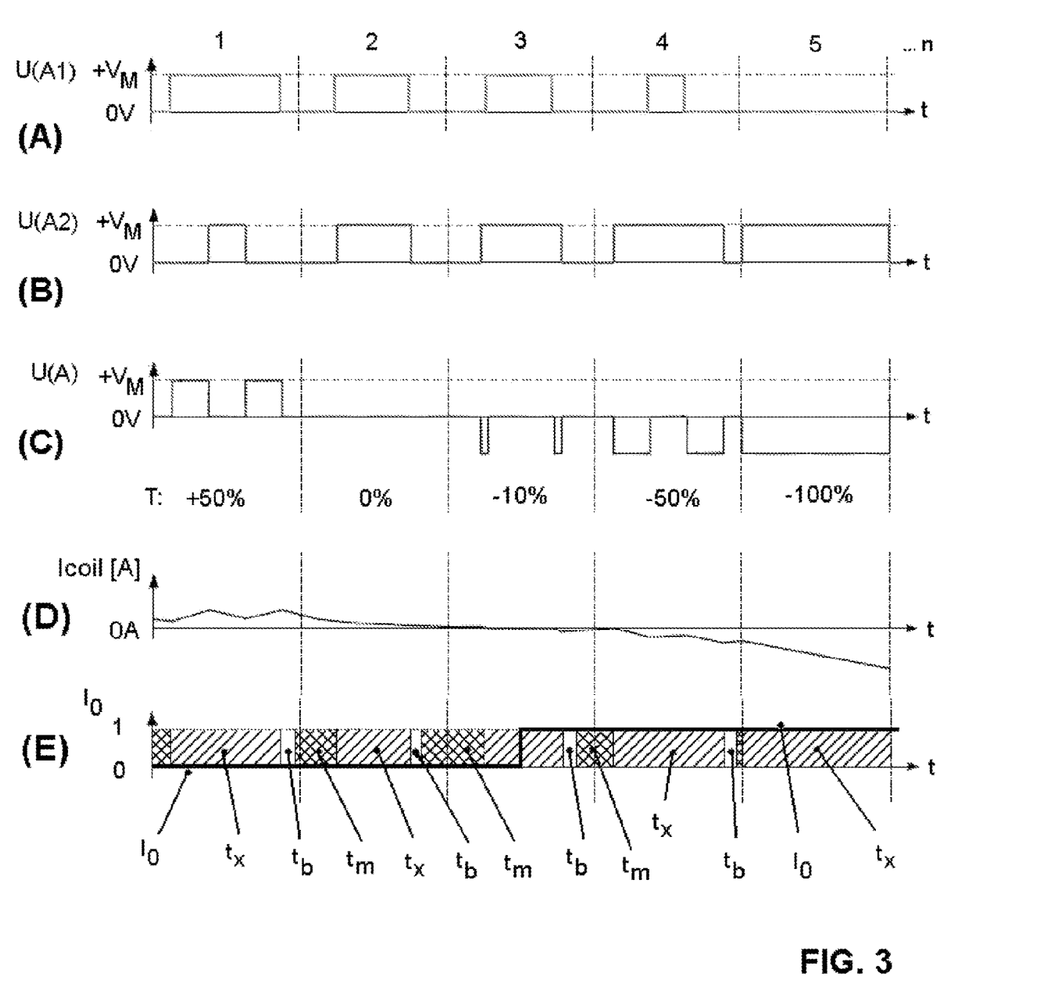
FIG. 3 time diagrams of PWM voltages applied to a motor coil and the currents generated thereby.

Furthermore, a driver circuit Tr is provided, with which control signals for the first and second semiconductor switches S1, S2 applied to low-side outputs LS1_A, LS2_A and control signals for the third and fourth semiconductor switches S3, S4 applied to high-side outputs HS1_A HS2_A are generated. The semiconductor switches S1, S2, S3, S4 are thus connected so that in the voltage-controlled or voltage-regulated operating mode, a first PWM voltage U(A1) according to FIG. 3(A) is applied in a first direction (polarity) to the first coil A and a second PWM voltage U(A2) according to FIG. 3(B) is applied in the opposite second direction (polarity), so that there is a resulting effective PWM coil voltage U(A)=U(A1)−U(A2) at the coil according to FIG. 3(C) with the duty cycle T specified there, by means of which a profile of the actual coil current Icoil depicted in FIG. 3(D) is generated (here in the region of the zero crossing).

Said coil current Icoil can be measured in the form of the positive or negative voltage drop generated at a measuring resistor RsA at the base point of the bridge circuit and be compared with a nominal coil current in order to correspondingly readjust the pulse duty factor T of the PWM coil voltage in a known manner.

The circuit assembly further comprises a first and a second comparator K1, K2, a digital-to-analogue converter DAC, a chopper CH-U (voltage chopper) for the voltage-based operating mode, a unit I-U for current tracking of the chopper CH-U, a multiplier M, a sequencer (particularly in the form of a sine/cosine table) and, according to the invention, a unit Nd for generating a load indicator signal L and preferably also for generating an overload indicator signal Ü.

These components are also provided in the same way for the second coil B of the motor Mt (in this example a 2-phase motor) and, if applicable, each further coil of the motor.

The circuit assembly comprises a first input for a predetermined (rotating) phase angle Phi(U) of a predetermined voltage (voltage specification) for the motor coils and a second input for a threshold value SwÜ for motor overload detection.

A current value of the load indicator signal L of the motor Mt is applied to a first output of the circuit assembly, while the overload indicator signal Ü is made available at a second output of the circuit assembly.

Digital switching signals PA1, PA2 are supplied to the driver circuit Tr to generate the control signals mentioned above for the semiconductor switches S1 to S4, the switching signals being generated at the two outputs of the chopper CH-U as a function of the input signal applied to the input thereof.

The input of the chopper CH-U is connected to an output of the multiplier M.

The positive or negative voltage that drops across the measuring resistor RsA according to the polarity of the coil currents is supplied to a first input of the second comparator K2, at the second input of which the output of the digital/analogue converter DAC is applied, with which voltage comparison values, which are preferably generated in the digital level, are converted into analogue voltage comparison values, in this way to compare the instantaneous actual coil current values with the respective instantaneous nominal coil current values.

Alternatively, for this purpose, it is also possible to dispense with the second comparator K2 and the digital/analogue converter DAC and instead provide an analogue/digital converter with which the voltage drop across the measuring resistor RsA is digitised, so that the comparison the actual and nominal coil currents are completely digital.

The output signal at the output of the second comparator K2 is supplied to a first input of the unit I-U for current tracking of the first chopper CH-U.

The specified (rotating) phase angle Phi(U) of the voltage specification applied to the first input of the circuit assembly is supplied to a first input of the unit Nd and to the sequencer SQ, with which the two 90° phase-shifted digital voltage specification values or nominal values for the first and the second coil A, B (sine/cosine signals), corresponding to the applied phase angle Phi, are generated at the first or third output thereof. In addition, the sequencer SQ generates a polarity signal Pol at a second and fourth output, which polarity signal indicates the instantaneous polarity of the respective voltage specification values for the first and second coils A, B, respectively. As already mentioned, only the circuit components and the signal processing for the first coil A are described below.

The voltage specification values Us for the first coil A at the output of the sequencer SQ are supplied to a second input of the unit I-U and to a first input of the multiplier M. The polarity signal Pol of said voltage specification values Us is supplied to a second input of the unit Nd.

At the first output thereof connected to an input of the digital-to-analogue converter DAC, the unit I-U generates the above-mentioned digital voltage comparison values as a function of the output signal of the second comparator K2 applied to the first input thereof and the nominal or voltage specification values applied to the second input thereof.

The unit I-U further generates at a second output, which output is connected to a second input of the multiplier M, a signal for scaling the voltage specification values Us applied to the first input of the multiplier M as a function of the output signal of the second comparator K2 in such a way that deviations of the actual coil current from the nominal coil current are counteracted. The output of the multiplier M, to which the scaled voltage specification values is thus applied, is connected to a first input of the chopper CH-U.

The unit I-U can be implemented in the manner described in WO2015/192831.

According to the invention, the two terminals of the first coil A are connected to the two inputs of the first comparator K1. Thus, the voltage dULS1 falling across the internal resistance RLS1 of the first semiconductor switch S1 is applied to a first input of the first comparator K1, while the voltage dULS2 falling across the internal resistance RLS2 of the second semiconductor switch S2 is supplied to a second input of the first comparator K1.

The first comparator K1 is used to evaluate and form the difference between the two voltages applied to the inputs thereof, so that the difference voltage Udiff=dULS1−dULS2=Icoil*(RLS1+RLS2) is created, which corresponds to the voltage drop across coil A, wherein RLS 1 and RLS2 denote the internal resistances of the first and second semiconductor switches S1, S2, respectively. When said difference is zero, there is a zero crossing of the actual coil current Icoil, wherein the exact value of the internal resistances of the semiconductor switches is not relevant.

As will be explained with reference to FIG. 3, the current zero crossing can only be determined in the time intervals tm in which either the two low-side semiconductor switches S1, S2 or the two high-side semiconductor switches are switched through, that is, both the first PWM voltage U(A1) according to FIG. 3(A) and the second PWM voltage U(A2) according to FIG. 3(B) are zero.

The occurrence of such a zero crossing of the coil current is associated with a change in sign of the difference voltage formed and thus the polarity of the coil current Icoil. Said change in sign is indicated at the output of the first comparator K1 by a change in the logic level of a zero-crossing signal l0 supplied to the unit Nd from "0" to "1" or vice versa. A profile of the zero-crossing signal l0 is shown in FIG. 3(E), wherein the "0" level thereof in the example depicted is associated with a positive polarity (direction) of the coil current Icoil and a "1" level of the zero-crossing signal l0 is associated with a negative polarity (or opposite direction) of the coil current Icoil through the coil A. Said association can of course also be made vice versa.

Figure 2:
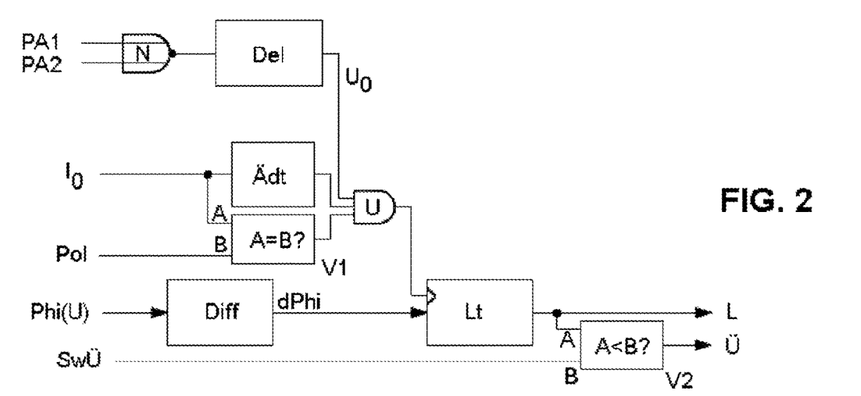
FIG. 2 a block diagram of a unit Nd from FIG. 1.

FIG. 2 shows a block diagram of the unit Nd for generating a load indicator signal L and preferably also for generating an overload indicator signal Ü.

The unit Nd comprises a logical NOR gate N, a logical AND gate U, a delay element Del, a change detector Ädt, a first and a second comparator V1, V2, a difference generator (that is, Phi(U) modulo 180° generator) Diff, and a latch Lt.

The two inputs of the NOR gate N, which are applied to the two outputs of the chopper CH-U, are supplied the digital switching signals PA1, PA2 generated thereby, by means of which the driver circuit (Tr) generates the control signals for the first to fourth semiconductor switches (S1, . . . S4) of the bridge circuit.

The output of the NOR gate N is connected to an input of the delay element Del, the output of which is in turn applied to a first input of the AND gate U.

An input of the change detector Ädt and a first input A of the first comparator V1, both of which are applied to the output of the first comparator K1, are supplied the zero-crossing signal l0 generated thereby.

An output of the change detector Ädt is connected to a second input of the AND gate U.

A second input B of the first comparator V1 applied to the second output of the sequencer SQ, is supplied the polarity or sign signal Pol of the instantaneous voltage specification values generated thereby. The output of the first comparator V1 is applied to a third input of the AND gate U.

The output of the AND gate U is connected to the trigger input of the latch Lt.

The difference generator Diff comprises an input applied to the first input terminal of the circuit assembly for the phase angle signal Phi(U), and an output connected to a signal input of the latch Lt.

The load indicator signal L is applied to the output of the latch Lt and is supplied to the first output terminal of the circuit assembly.

The output of the latch Lt is further connected to a first input A of the second comparator V2, to the second input B of which the threshold value signal for overload detection SwÜ is applied, which, as mentioned above, is supplied to the second input terminal of the circuit assembly.

Finally, the overload signal Ü is applied to the output of the second comparator V2 and is supplied to the second output terminal of the circuit assembly.

Said unit Nd works as follows:

As already mentioned, the chopper CH-U generates digital switching signals PA1, PA2, with which the semiconductor switches S1, S2, S3 and S4 are switched by means of the driver circuit Tr in such a way that the first and the second PWM voltage U(A1), U(A2) according to FIGS. 3(A) and 3(B) are applied to the coil A and which results in an effective coil voltage U(A)=U(A1)−U(A2) on the coil.

The above-explained measurement according to the invention of the voltages dropping across the coil or at the internal resistances of the semiconductor switches (which are supplied to the first comparator K1) can only take place in the time intervals tm in which the PWM voltages U(A1), U(A2) applied to the coil according to FIGS. 3(A) and 3(B) are both zero, that is, the two low-side MOSFETs S1 and S2 or the two high-side MOSFETs S3, S4 are switched through.

The NOR gate N is used to detect said time intervals and then and only then generates a logic "1" signal (coil voltage zero signal U0) at the output thereof when the two digital switching signals PA1, PA2 each signal a switch-on signal of the relevant semiconductor switch and thus a digital zero level of the two PWM voltages U(A1), U(A2).

The delay element Del is used to delay the relaying of the logic coil voltage zero signal (U0) generated by the NOR gate N to the first input of the AND gate U in order to take into account a blank time tb caused by the semiconductor switch and possibly the first comparator K1 in the time profile of the zero-crossing signal l0 generated according to FIG. 3(E).

The change detector Ädt generates a logic "1" signal at the output thereof when the logic level of the zero-crossing signal l0 changes from "0" to "1" or vice versa, that is, when a zero crossing or polarity change of the actual coil current Icoil as mentioned above is detected by means of the first comparator K1.

The zero-crossing signal l0 (the logical "0" and "1" level of which is associated with the positive or negative polarity of the coil current Icoil as mentioned above) is compared with the polarity or sign signal Pol of the voltage specification values by means of the first comparator V1. The first comparator V1 generates a logic "1" signal at the output thereof when the instantaneous polarities of said two signals are the same.

Thus, a logic "1" signal is generated at the output of the AND gate U when the two PWM voltages U(A1) and U(A2) instantaneously applied to the relevant coil are zero (and the specified delay time tb has elapsed), when, in addition, a zero crossing of the actual coil current Icoil is detected by the explained formation of the difference between the voltages dropping across the two semiconductor switches S1, S2 and when the instantaneous polarity of the voltage specification values matches the instantaneous polarity of the coil current Icoil (after the aforementioned zero crossing).

The difference generator Diff is used to determine an instantaneous phase angle difference dPhi between the applied instantaneous phase angle signal Phi(U) of the voltage specification (which lies between 0° and 360°) and the respective closest, chronologically preceding zero crossing of said voltage specification. The phase angle difference dPhi generated at the output thus lies between 0° and +180°.

The difference generator Diff thus implements a mathematical modulo function, namely Phi(U) modulo 180°.

Said phase angle difference dPhi instantaneously applied to the switching input of the latch Lt is switched through as load indicator signal L at the output thereof when the output signal of the AND gate U supplied to the trigger input of the latch Lt has the logic "1" level. Thus, the smaller the load indicator signal L, the greater the motor load and vice versa. If necessary, it can be standardised and converted into a load angle.

The second comparator V2 finally generates an overload signal Ü at the output thereof when the load indicator signal L applied to the first input A is less than the overload threshold value SwÜ applied to the second input B.

FIG. 3 shows, for the above-mentioned voltage-based (that is, voltage-controlled or voltage-regulated) operating mode of the stepper motor for five current flow cycles (also called chopper cycles) 1, 2, 3, . . . 5, the mentioned first and second PWM voltage U(A1), U(A2), which are applied to the coil A by accordingly switching the semiconductor switches of the bridge circuit according to FIG. 1, and with opposite polarities in each case, so that by changing the pulse widths of said two voltages relative to one another, an effective PWM voltage in the form of a differential voltage U(A)=U(A1)−U(A2) according to FIG. 3(C) is applied to the motor coil with positive or negative polarity, the effective duty cycle of which T can thus be set between −100% (negative polarity) and +100% (positive polarity). The actual coil current profile Icoil resulting therefrom (here in the region of the zero crossing) is indicated by way of example in FIG. 3(D).

The entire current profile Icoil is generated by a plurality n of such current flow cycles 1, 2, . . . n. Reference is made in detail to the already mentioned WO 2015/192831.

As already mentioned, FIG. 3(E) shows the associated profile of the zero-crossing signal I0 at the output of the first comparator K1 in FIG. 1, the logic level of which changes when a zero crossing of the actual coil current Icoil determined as described above occurs.

Furthermore, those time intervals tm in which the two low-side semiconductor switches (MOSFETs) S1, S2 are switched through are also marked there. The length of these time intervals tm corresponds in each case to the period of time during which both PWM coil voltages U(A1) and U(A2) are zero, minus the blank time tb, which is also marked. Finally, the time intervals tx are also indicated in which either U(A1) or U(A2) are not zero and thus no measurement of the voltage drop across the semiconductor switches S1, S2 or across the coil A is possible.

Thus, with a duty cycle of 0%, no current flows through the measuring resistor RsA (see FIG. 1), however, a voltage drop dULS1=Icoil*RLS1 or dULS2=Icoil* RLS2 can be measured at the two internal resistances of the low-side semiconductor switches (MOSFETs) S1 and S2, wherein the zero-crossing signal l0 is generated from the difference thereof, as explained above, by means of the first comparator K1.

Figure 4:
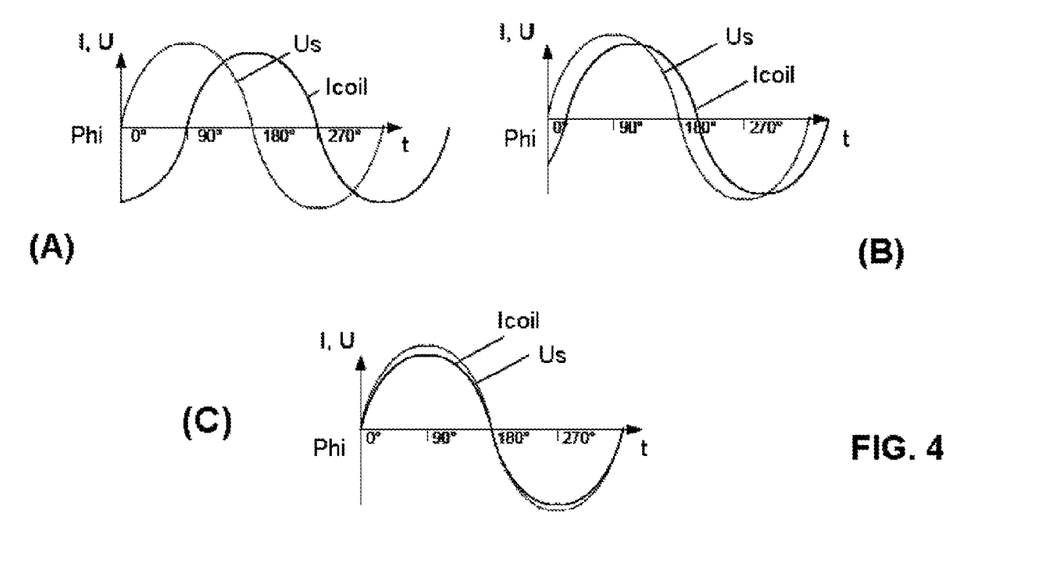
FIG. 4 exemplary time profiles of coil voltages and resulting coil currents with different motor loads.

FIG. 4 shows the respective phase shift for three different motor loads between the predetermined coil voltage Us (nominal voltage, voltage specification), generated by means of the sequencer SQ from the applied phase angles Ph(U) and depicted in analogue form, and the actual coil current Icoil.

According to FIG. 4(A), the coil current Icoil follows the coil voltage Us with only a very low load on the motor with a phase offset of approximately 90°. FIG. 4(B) shows the case of an average motor load with a significantly lower phase offset, while FIG. 4(C) depicts a phase shift of almost 0° (corresponding to a load angle of about 90), which phase offset is generated by a high or maximum motor load.

Figure 5:
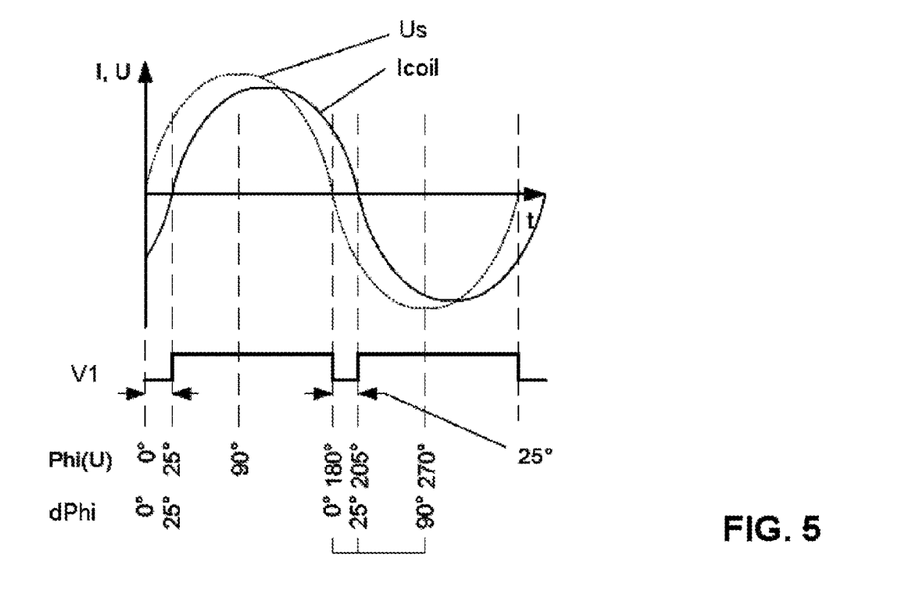
FIG. 5 a time profile of a coil voltage and a coil current to illustrate a load indicator determination.

FIG. 5 shows the relationships between the time profile of the predetermined coil voltage Us and the coil current Icoil generated thereby, which here has a phase offset of 25° to the voltage Us. Furthermore, the output signal of the first comparator V1 is depicted, which only then has a logic "1" level when (see above) the polarity of the predetermined coil voltage Us matches the polarity of the coil current Icoil. Conversely, the output signal of the first comparator V1 assumes the logic "0" level as soon as the voltage Us has a zero crossing, namely until the (lagging) current Icoil also passes the zero crossing.

Furthermore, the time profile of the voltage specification signal supplied to the circuit assembly is depicted in the form of the circumferential phase angle Phi(U) of said voltage. Finally, the time profile of the difference or modulo signal dPhi=Phi(U) modulo 180° at the output of the difference generator Diff is also shown, which results for the phase shift shown as an example of the (lagging) coil current Icoil compared to the applied coil voltage Us of 25°.

What is claimed is:

1. A zero-crossing detection method comprising:
    applying to a coil a first PWM voltage in a first direction and a second PWM voltage in a second direction that is opposite to the first direction to obtain an effective PWM coil voltage, the coil being coupled within a bridge circuit that comprises a first switch having a first internal resistance and a second switch having a second internal resistance;
    in response to the effective PWM coil voltage being zero, determining, between a first voltage at the first internal resistance and a second voltage at the second internal resistance, a difference voltage that, in response to being zero, indicates a current zero-crossing;
    using the difference voltage to generate a current zero-crossing signal; and
    in response to receiving a phase angle of a predetermined coil voltage, generating by a difference generator a phase angle difference signal.

2. The zero-crossing detection method of claim 1, wherein the current zero-crossing represents a change in a polarity of a current flowing through the coil.

3. The zero-crossing detection method of claim 1, further comprising using the current zero-crossing signal to detect a load condition of a load that is coupled to the coil.

4. The zero-crossing detection method of claim 3, wherein detecting the load condition comprises detecting a phase shift between a zero-crossing of the predetermined coil voltage and the current zero-crossing.

5. A circuit for detecting a load condition, the circuit comprising:
    a bridge circuit that comprises:
        a first switch having a first internal resistance;
        a second switch having a second internal resistance; and
        a coil that operates as at least one of a motor or a generator;
    a control circuit coupled to the bridge circuit, the control circuit performing steps comprising:
        obtaining an effective PWM coil voltage by causing a first PWM voltage to be applied to the coil in a first direction and causing a second PWM voltage to be applied to the coil in a second direction opposite to the first direction;
        in response to the effective PWM coil voltage being zero, determining, between a first voltage at the first internal resistance and a second voltage at the second internal resistance, a difference voltage that, in response to being zero, indicates a current zero-crossing; and
        using the difference voltage to generate a current zero-crossing signal;
    a difference generator that, in response to receiving a phase angle of a predetermined coil voltage, generates a phase angle difference signal.

6. The circuit of claim 5, wherein the current zero-crossing represents a change in a polarity of a current flowing through the coil.

7. The circuit of claim 5, wherein the difference voltage corresponds to a voltage at the coil.

8. The circuit of claim 5, wherein the effective PWM coil voltage has a variable duty cycle.

9. The circuit of claim 5, further comprising using the current zero-crossing signal to detect a load condition of a load that is coupled to the coil.

10. The circuit of claim 9, wherein detecting the load condition comprises detecting a phase shift between a zero-crossing of the predetermined coil voltage and the current zero-crossing.

11. The circuit of claim 5, wherein the phase angle difference signal represents a modulo function.

12. The circuit of claim 5, further comprising a latch comprising a signal input, a switching input, and a signal output.

13. The circuit of claim 12, wherein, in response to the current zero-crossing signal indicating a polarity change in the difference voltage and the effective PWM coil voltage being zero, applying the phase angle difference signal to the signal input.

14. The circuit of claim 13, further comprising switching the phase angle difference signal through to the signal output and using the signal output as a load indicator signal.

15. The circuit of claim 5, further comprising a comparator that generates the difference voltage and comprised inputs that are coupled to terminals of the coil.

16. The circuit of claim 5, further comprising a timing circuit that detects time intervals at which the effective PWM coil voltage applied to the coil assumes a zero value.

17. The circuit of claim 16, wherein the timing circuit, in response to the effective PWM coil voltage being zero, generates a logic signal that indicates a polarity change of the effective PWM coil voltage.

* * * * *